United States Patent
Hashimoto

(10) Patent No.: US 10,298,546 B2
(45) Date of Patent: May 21, 2019

(54) ASYMMETRICAL ENCRYPTION OF STORAGE SYSTEM TO PROTECT COPYRIGHT AND PERSONAL INFORMATION

(71) Applicant: Toshiba Memory Corporation, Tokyo (JP)

(72) Inventor: Daisuke Hashimoto, Cupertino, CA (US)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

(21) Appl. No.: 14/200,288

(22) Filed: Mar. 7, 2014

(65) Prior Publication Data

US 2015/0256333 A1 Sep. 10, 2015

(51) Int. Cl.
*H04L 29/06* (2006.01)
*H04L 9/08* (2006.01)
*H04N 21/6334* (2011.01)
*H04N 21/835* (2011.01)

(52) U.S. Cl.
CPC ........ *H04L 63/0428* (2013.01); *H04L 9/0866* (2013.01); *H04L 9/0894* (2013.01); *H04L 63/06* (2013.01); *H04L 63/10* (2013.01); *H04N 21/63345* (2013.01); *H04N 21/835* (2013.01); *H04L 2209/605* (2013.01)

(58) Field of Classification Search
CPC ..... H04L 63/0428; H04L 63/06; H04L 63/10; H04L 9/0866; H04L 9/0894; H04N 21/63345; H04N 21/835
See application file for complete search history.

(56) References Cited

U.S. PATENT DOCUMENTS

| | | | | |
|---|---|---|---|---|
| 5,748,983 | A * | 5/1998 | Gulick | G06F 13/1605 710/100 |
| 6,230,272 | B1 * | 5/2001 | Lockhart | G06F 21/62 726/2 |
| 6,266,271 | B1 | 7/2001 | Kawamura | |
| 7,334,265 | B1 | 2/2008 | Morishita | |
| 7,389,415 | B1 * | 6/2008 | Kumar | G06F 21/72 713/162 |
| 7,421,741 | B2 * | 9/2008 | Phillips, II | H04L 63/045 380/259 |
| 8,111,828 | B2 * | 2/2012 | Raman | H04L 9/32 380/277 |
| 8,170,213 | B1 * | 5/2012 | Harwood | H04L 9/0822 380/277 |

(Continued)

*Primary Examiner* — Saleh Najjar
*Assistant Examiner* — Louis C Teng
(74) *Attorney, Agent, or Firm* — Kim & Stewart LLP

(57) ABSTRACT

Robust security of copyright-protected content is provided when such content is digitally stored in a storage device of a client device in encrypted form. The copyright-protected content is encrypted by a server device using a private key and a corresponding public key is used for decryption by the client device. Because access to the private key cannot be determined from the corresponding public key, and because the private key and public key are based at least in part on a unique ID number embedded in the data storage device, decryption can only be performed by the data storage device in the client device. In some embodiments, robust security of private data stored in a server device is provided using a similar public-key/private-key pair and encryption scheme.

15 Claims, 8 Drawing Sheets

(56) References Cited

U.S. PATENT DOCUMENTS

| | | |
|---|---|---|
| 8,631,191 B2 | 1/2014 | Hashimoto |
| 2002/0065777 A1* | 5/2002 | Kondo .................. G06Q 20/12 |
| | | 705/54 |
| 2003/0195856 A1* | 10/2003 | Bramhill ................ G06F 21/10 |
| | | 705/57 |
| 2008/0002826 A1 | 1/2008 | Nakamae et al. |
| 2008/0091736 A1* | 4/2008 | Sawayanagi .......... G06F 21/606 |
| 2008/0189550 A1 | 8/2008 | Roundtree |
| 2009/0034733 A1* | 2/2009 | Raman ..................... H04L 9/32 |
| | | 380/277 |
| 2009/0144549 A1 | 6/2009 | Matsuyama et al. |
| 2010/0226628 A1* | 9/2010 | Yamaji .................. H04N 13/30 |
| | | 386/353 |
| 2010/0228975 A1* | 9/2010 | Lipka ................... H04L 63/061 |
| | | 713/168 |
| 2010/0257360 A1* | 10/2010 | Bae ....................... H04L 9/0866 |
| | | 713/168 |
| 2011/0033170 A1* | 2/2011 | Ikeda .................. G11B 27/034 |
| | | 386/244 |
| 2011/0235988 A1* | 9/2011 | Leichsenring ....... G11B 27/322 |
| | | 386/230 |
| 2012/0101623 A1* | 4/2012 | Hwang .................. G06F 21/10 |
| | | 700/117 |
| 2013/0191626 A1* | 7/2013 | Kuno .................. H04L 63/0428 |
| | | 713/150 |
| 2013/0230171 A1* | 9/2013 | Ivanchykhin ......... H04L 63/108 |
| | | 380/259 |
| 2013/0268771 A1* | 10/2013 | Blankenbeckler ........ H04L 9/08 |
| | | 713/189 |
| 2013/0305039 A1* | 11/2013 | Gauda ................ G06F 21/6218 |
| | | 713/153 |
| 2013/0311781 A1* | 11/2013 | Wang .................... H04L 9/3247 |
| | | 713/176 |
| 2013/0336479 A1* | 12/2013 | Kato ..................... H04L 9/0844 |
| | | 380/44 |
| 2013/0336489 A1* | 12/2013 | Kato ..................... H04L 9/0822 |
| | | 380/285 |
| 2013/0339732 A1 | 12/2013 | Nagai et al. |
| 2013/0339733 A1* | 12/2013 | Nagai .................. H04L 9/3234 |
| | | 713/168 |

* cited by examiner

ASYMMETRICAL ENCRYPTION OF STORAGE SYSTEM TO PROTECT COPYRIGHT AND PERSONAL INFORMATION

BACKGROUND

The use of entertainment service providers for downloading entertainment content has recently become widespread. For example, downloading from the iTunes Store, Google Play, etc. is now one of the most common methods employed by consumers for acquiring music and video content. With so much entertainment content commonly being stored on user storage devices, such as hard disk drives and solid state drives, copyright protection of digital entertainment content is an important issue.

Many techniques have been used for copyright-protection of digital content stored by end-users, typically involving the format of the digital content and/or the application layer of the device used to play the digital content. Unfortunately, reverse engineering of copyright-protection software, which is generally present on a player device, is often practicable, and results in unauthorized copying of the copyright-protected digital content. In light of the above, there is a need in the art for more robust copyright-protection of digital content stored by an end-user.

SUMMARY

Embodiments provide systems and methods for robust security of copyright-protected content when such content is digitally stored in a computing system of an end-user.

According to an embodiment, a data storage device of a first computing device (e.g., a computing device of an end-user) comprises a decryption key generator, a decryption engine, and a storage medium that stores encrypted data that have been encrypted by a second computing device (e.g., a computing device of the copyright-protected content provider). The decryption key generator is configured to generate a decryption key based at least in part on a unique ID number associated with the data storage device, and the decryption engine is configured to convert the encrypted data into decrypted data using the decryption key.

A method of downloading data to a data storage device, according to an embodiment, includes the steps of receiving a download request from a client device that includes the data storage device, generating an encryption key based on a unique ID number associated with the data storage device, converting the data to encrypted data using the encryption key, and transmitting the encrypted data to the client device for storage in the data storage device.

A method of streaming encrypted data stored in a data storage device of a first computing device to a media player configured in the first computing device, according to an embodiment, includes the steps of generating a decryption key based at least in part on a unique ID number associated with the data storage device, converting encrypted data that have been encrypted by a second computing device and stored in the data storage device, to decrypted data using the decryption key, and transmitting the decrypted data to a media player.

BRIEF DESCRIPTION OF THE DRAWINGS

For clarity, identical reference numbers have been used, where applicable, to designate identical elements that are common between figures. It is contemplated that features of one embodiment may be incorporated in other embodiments without further recitation.

DETAILED DESCRIPTION

Embodiments provide systems and methods for robust security of copyright-protected content when such content is digitally stored in a data storage device of a client device in encrypted form. In one or more embodiments, copyright-protected content is encrypted using a private key. The encrypted data are downloaded to a client device of an end-user, and stored in encrypted form in the data storage device of the client device. The private key is based at least in part on a unique ID number associated with the data storage device. For the end-user to access the copyright-protected content, the data storage device decrypts the copyright-protected content using a public key that is also based at least in part on the unique ID number associated with the data storage device so as to be matched to the private key. If the copyright-protected content is copied to another data storage device in the encrypted form, this other data storage device will not be able generate a correct public key to decrypt the copyright-protected content, because the unique ID number associated with this other data storage device will be different.

Figure 1:
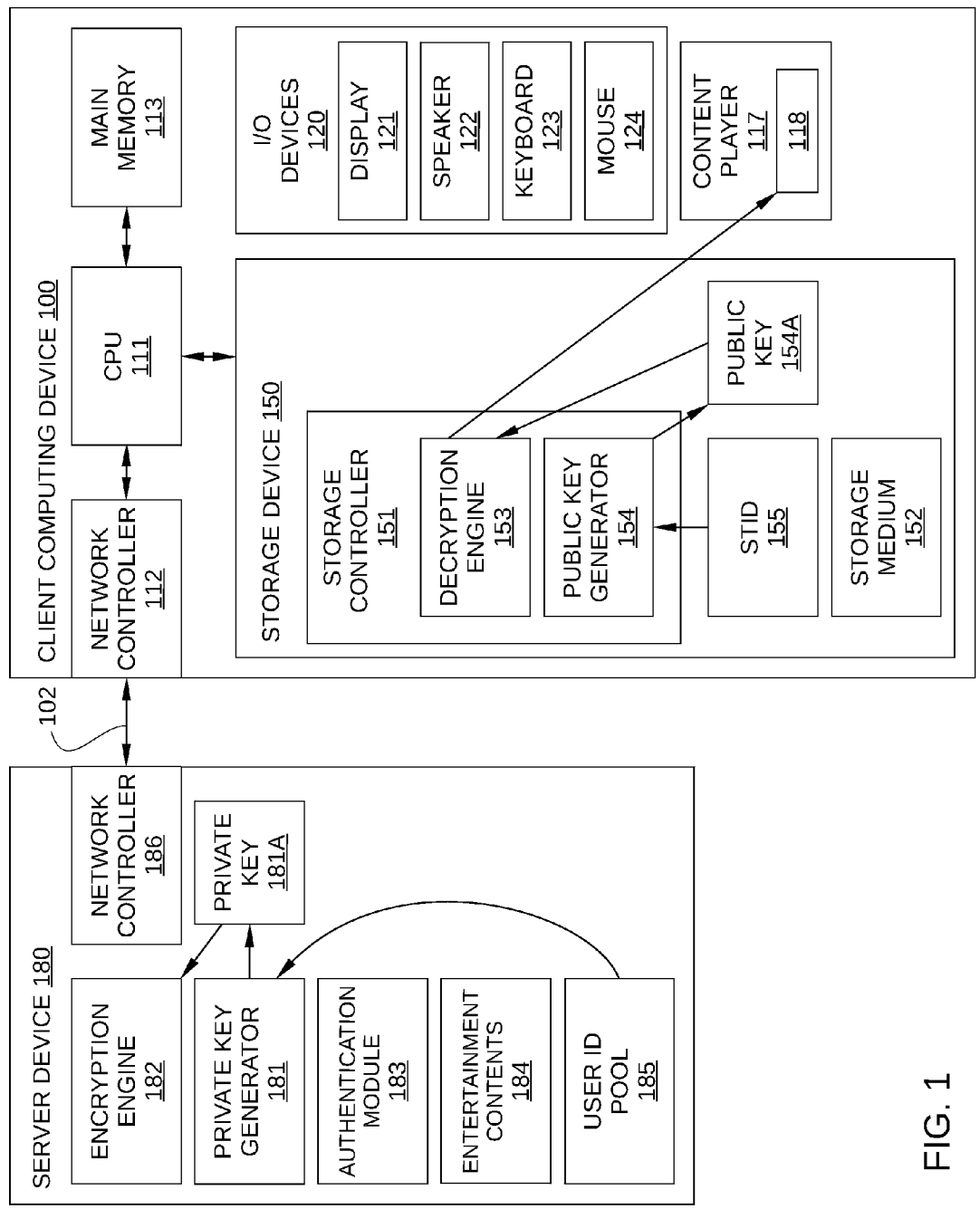
FIG. 1 is a block diagram of a client computing system and a server device, in which embodiments may be implemented.

FIG. 1 is a block diagram of a client computing device 100 and a server device 180, in which embodiments may be implemented. Client computing device 100 is communicatively coupled to server device 180 via a network 102, and may be any electronic device that can be configured as a client computing device to server device 180, such as a desktop computer, a laptop computer, a smartphone, a digital tablet, a personal digital assistant, a gaming console, or any other technically feasible computing device. Client computing device 100 includes a central processing unit (CPU) 111, a network controller 112, a main memory 113, input/output (I/O) devices 120, and a data storage device 150, and is configured with an entertainment content player 117. Server device 180 may be any computing system that can be configured as a server device to one or more client computing devices 100, such as a server of a cloud computing system. Server device 180 has configured therein a private key generator 181, an encryption engine 182, an authentication module 183, and a network controller 186 connected to network 102. Server device 180 also makes entertainment contents 184 available for download to various users, and user IDs of such users are stored in a user ID pool 185.

CPU 111 may be any technically feasible processor, including a graphics processing unit (GPU), an application processor or other logic device, and/or a system-on-chip. Network controller 112 is configured to facilitate communications with one or more other computing devices, such as server device 180, over a network communication link, such as network 102. Network 102 may be any technically feasible type of communications network that allows data to be exchanged between client computing device 100 and external entities or devices, such as server device 180. For example, network 102 may include a wide area network (WAN), a local area network (LAN), a wireless network, and/or the Internet, among others. Main memory 113 may include volatile memory, such as random access memory (RAM), and non-volatile memory, such as read-only memory (ROM). I/O devices 120 may include devices capable of providing output, such as a display device 121, one or more speakers 122, and so forth, as well as devices capable of providing input, such as keyboard 123, a mouse 124, and others (such as a touch screen).

Entertainment content player 117 may be software, hardware, or firmware that is configured to play entertainment content stored in data storage device 150, such as movies, videos, music, video games, and the like. Examples of entertainment content may include content purchased by an end-user from an online electronics and digital media store, such as Google Play or iTunes, e.g., songs, videos, movies, video games, etc. In some embodiments, entertainment content player 117 includes a dedicated memory 118, which may be a buffer or other portion of main memory 113 that is associated with entertainment content player 117. Dedicated memory 118 may be configured to temporarily store entertainment content streamed or otherwise transmitted to entertainment content player 117 for playing.

Data storage device 150 provides non-volatile storage and decryption of copyright-protected entertainment content for client computing device 100. To that end, data storage device 150 includes a storage controller 151 and a storage medium 152, and is configured with a storage device ID (STID) 155. Storage medium 152 includes one or more non-volatile memory elements, such as a magnetic or optical hard disk drive, a flash memory drive, a hybrid magnetic and flash memory drive, and the like. STID 155 is a unique ID number associated with data storage device 150, such as a unique identifier assigned to data storage device 150 by the manufacturer of data storage device 150. For example, STID 155 may be a media access control (MAC) address, a worldwide name (WWN), or an extended unique identifier (EUI) that is stored in a hardware component of data storage device 150, such as a region of read-only memory or a firmware storage area in data storage device 150. In some embodiments, a hashed version of STID 155 is stored in data storage device 150.

Storage controller 151 controls the operations of data storage device 150, including read and write operations to storage medium 152, and decryption of encrypted data stored on storage medium 152. As shown, storage controller 151 includes a decryption engine 153 and a public key generator 154. Decryption engine 153 is configured to employ a public key 154A, which is generated by public key generator 154 for decryption of encrypted data stored on storage medium 152, when the encrypted data to be decrypted have been encrypted with encryption engine 182 using a private key 181A generated by private key generator 181 (described below) of server device 180. In some embodiments, public key 154A and private key 181A make up a public-private key pair of an asymmetric key encryption scheme, such that any content encrypted with private key 181A can be decrypted using public key 154A. As is further described below, STID 155 is used in generating both private key 181A and public key 154A. As a result, the public-private key pair that is generated by public key generator 154 and private key generator 181 becomes unique to a particular storage device 150.

Authentication module 183 of server device 180 is configured to authenticate a user ID of a client computing device that seeks access to entertainment contents 184 managed by server device 180. Any of the known authentication methods may be employed by authentication module 183 including password authentication. User ID pool 185 maintains a mapping of user IDs to STIDs, such that when a user ID is authenticated, private key generator 181 finds the STID corresponding to the authenticated user ID in user ID pool 185 and generates private key 181A using this STID.

It is noted that neither storage controller 151 nor any other component of client computing device 100 includes an encryption engine, such as encryption engine 182 of server device 180. Thus, in embodiments in which a public-private key pair is employed for encryption and decryption (e.g., public key 154A and private key 181A), an end-user does not have access to private key 181A. Instead, an end-user has access only to public key 154A, which is employed by data storage device 150 to decrypt such data stored on storage medium 152.

In public-key cryptography, it is computationally infeasible for a properly generated private key to be determined from the corresponding public key. Consequently, an end-user with access to public key 154A cannot determine the private key 181A employed by encryption engine 182 to encrypt the data stored on storage medium 152. Furthermore, since private key generator 181 generates private key 181A based at least in part on STID 155, public key 154A is only valid for decrypting data stored on a storage device associated with STID 155 (i.e., data storage device 150). Thus, when encrypted data stored on storage medium 152 is copied onto an unauthorized storage device, the public key generated by the unauthorized storage device will be based on a different STID and the unauthorized storage device will not be able to correctly decrypt the encrypted copyright-protected data.

In some embodiments, private key generator 181 may also generate private key 181A based at least in part on a unique ID number associated with client computing device 100 in addition to STID 155. The unique number may be a MAC address, an EUI, or the like. In such embodiments, security of copyright-protected data stored in data storage device 150 is enhanced. Specifically, this additional security measure protects against removal of data storage device 150 from client computing device 100, because any other computing device coupled to data storage device 150 will have a different unique ID number than that for client computing device 100.

In the embodiments described above, different keys are employed for encryption of entertainment contents 184 and decryption of encrypted entertainment contents. In alternative embodiments, identical keys may be used.

Figure 2:
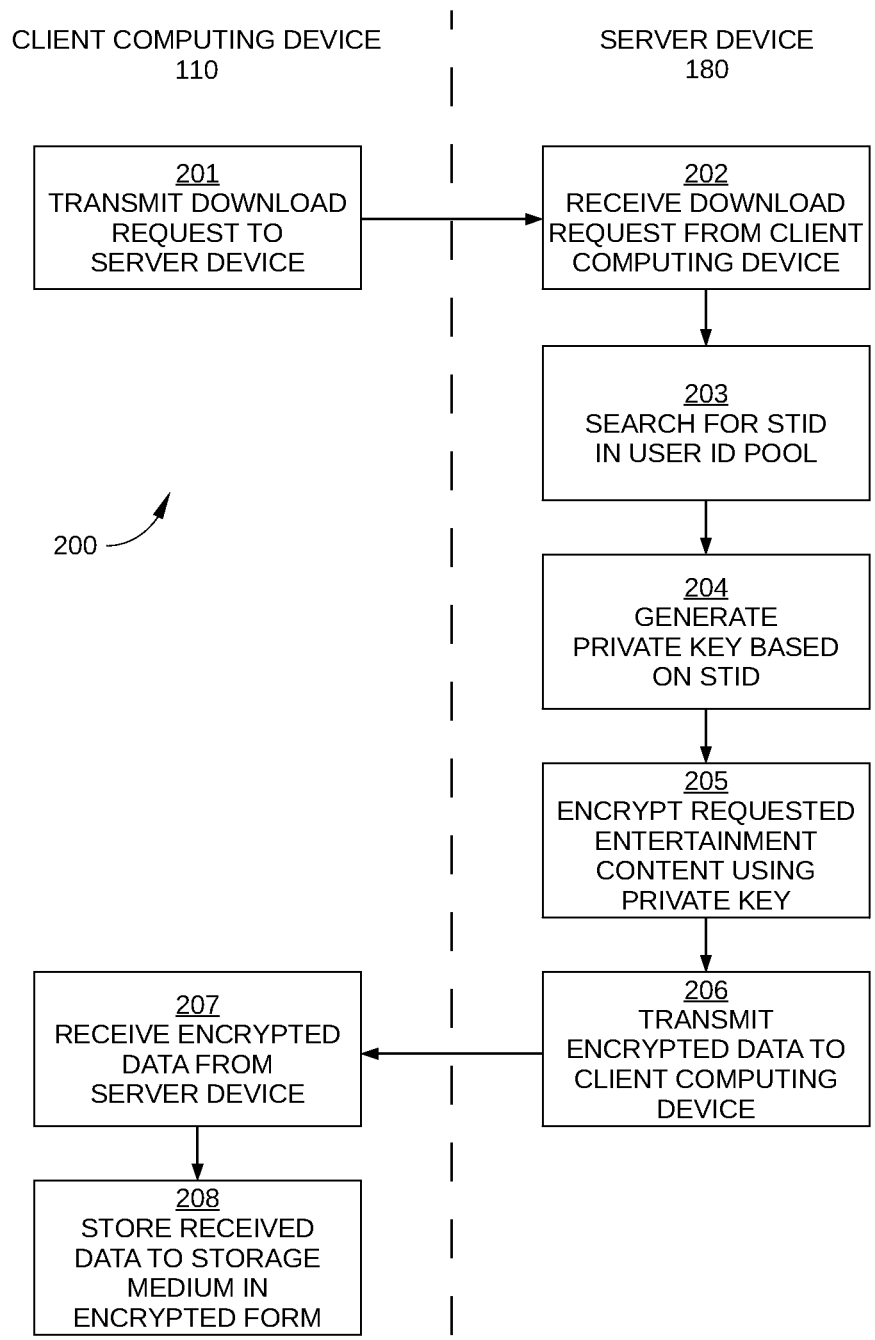
FIG. 2 sets forth a flowchart of method steps carried out by the data storage device and server device of FIG. 1 when an end-user makes an authorized request for entertainment content from the server device, according to some embodiments.

FIG. 2 sets forth a flowchart of method steps carried out by data storage device 150 and server device 180 when an end-user makes a request for entertainment content from server device 180, according to some embodiments. Although the method steps are described in conjunction with client computing device 100 and server device 180 in FIG. 1, persons skilled in the art will understand that the method in FIG. 2 may also be performed with other types of computing systems. Prior to the method steps described herein, it is assumed that an end-user has logged in and the user ID of the end-user has been authenticated. After logging in, the end-user requests a download of entertainment content from server device 180 to client computing device 100. For example, an end-user may request to download a movie, game, or video from an online electronics and digital media store.

As shown, method 200 begins at step 201, where storage controller 151 of data storage device 150 transmits a contents download request to server device 180.

When multiple STIDs are associated with a single user ID, such as when an end-user has registered multiple computing devices with an online digital media store, the contents download request received in step 201 may include STID 155 of data storage device 150. In step 202, server device 180 receives the download request. In step 203, server device 180 searches for the STID 155 corresponding to the authenticated user ID in user ID pool 185. In some embodiments, the download request includes STID 155, and in such embodiments, server device 180 does not need to search user ID pool 185. In step 204, private key generator 181 generates a private key 181A based at least in part on STID 155. In some embodiments, private key generator 181 also uses a unique ID number associated with client computing device 100 to generate private key 181A, for added security. In step 205, encryption engine 182 encrypts the requested entertainment content 184 using private key 181A. In step 206, server device 180 transmits the encrypted data to client computing device 100. In step 207, storage controller 151 receives the encrypted data from server device 180. In step 208, storage controller 151 stores the received encrypted data in storage medium 152.

Figure 3:
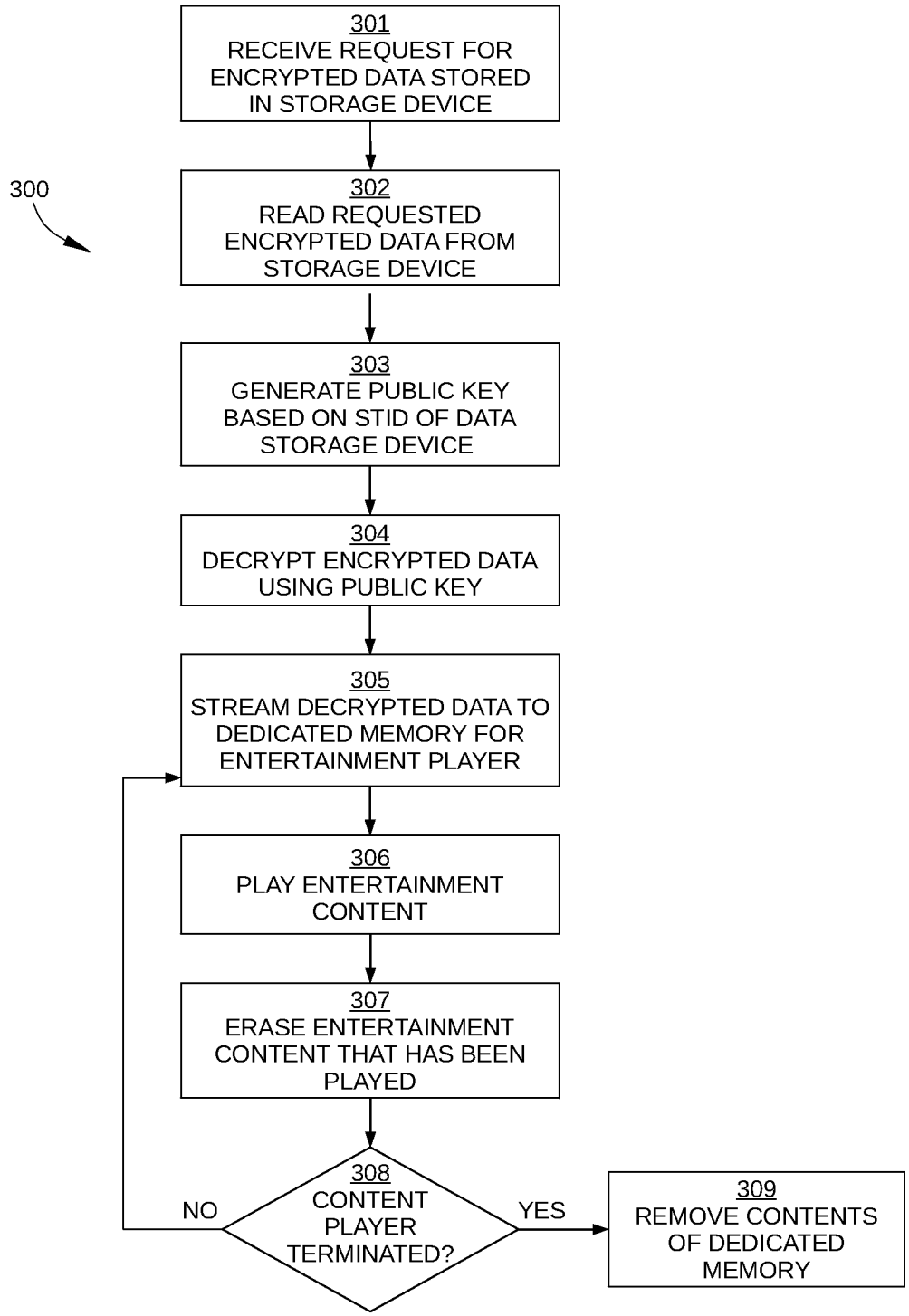
FIG. 3 sets forth a flowchart of method steps carried out by the client computing system of FIG. 1 when an end-user requests that entertainment content stored on a storage medium be played, according to some embodiments.

FIG. 3 sets forth a flowchart of method steps carried out by client computing system 100 when an end-user requests that entertainment content stored on storage medium 152 be played, according to some embodiments. Although the method steps are described in conjunction with client computing device 100 in FIG. 1, persons skilled in the art will understand that the method in FIG. 3 may also be performed with other types of computing systems.

As shown, method 300 begins at step 301, where storage controller 151 of data storage device 150 receives a request for encrypted data (e.g., entertainment content) stored in data storage device 150. In step 302, storage controller 151 reads the requested encrypted data from storage medium 152. In step 303, public key generator 154 generates a public key 154A based on STID 155 embedded in data storage device 150. In step 304, decryption engine 153 decrypts the encrypted data read from storage medium 152. In step 305, storage controller 151 streams or otherwise transmits entertainment content, in decrypted form, to dedicated memory 118 in entertainment content player 117. In step 306, entertainment content player 117 plays some or all of the contents of dedicated memory 118. In step 307, entertainment content player 117 erases or otherwise destroys the contents of dedicated memory 118 that has already been played to prevent unauthorized copy of the decrypted data from dedicated memory 118. The streaming continues until entertainment content player 117 is terminated. Accordingly, in step 308, client computing device 100 determines whether entertainment content player 117 has been terminated. If so, method 300 proceeds to step 309. On the other hand, if client computing device 100 determines that entertainment content player 117 is still running, method 300 returns to step 305. Upon termination of entertainment content player 117, all contents of dedicated memory 118 are erased in step 309. For example, when dedicated memory 118 is a region of RAM included in client computing device 100, that region of RAM can simply not be refreshed, and all data stored therein are lost in a few milliseconds. Alternatively, any data present in dedicated memory 118 in step 309 may be overwritten, deleted, marked invalid, or otherwise eliminated or made unusable.

It is noted that the decrypted version of entertainment content streamed or otherwise transmitted to entertainment content player 117 is only present in client computing device 100 in a transient form. Namely, such decrypted entertainment content may be transmitted to entertainment content player 117 via a bus and temporarily stored in dedicated memory 118, such as a buffer or other volatile memory resource associated with entertainment content player 117. As described above in step 308, the contents of dedicated memory 118 are erased after entertainment content player 117 is terminated. Thus, the entertainment content is persistently stored only in encrypted form.

Figure 4:
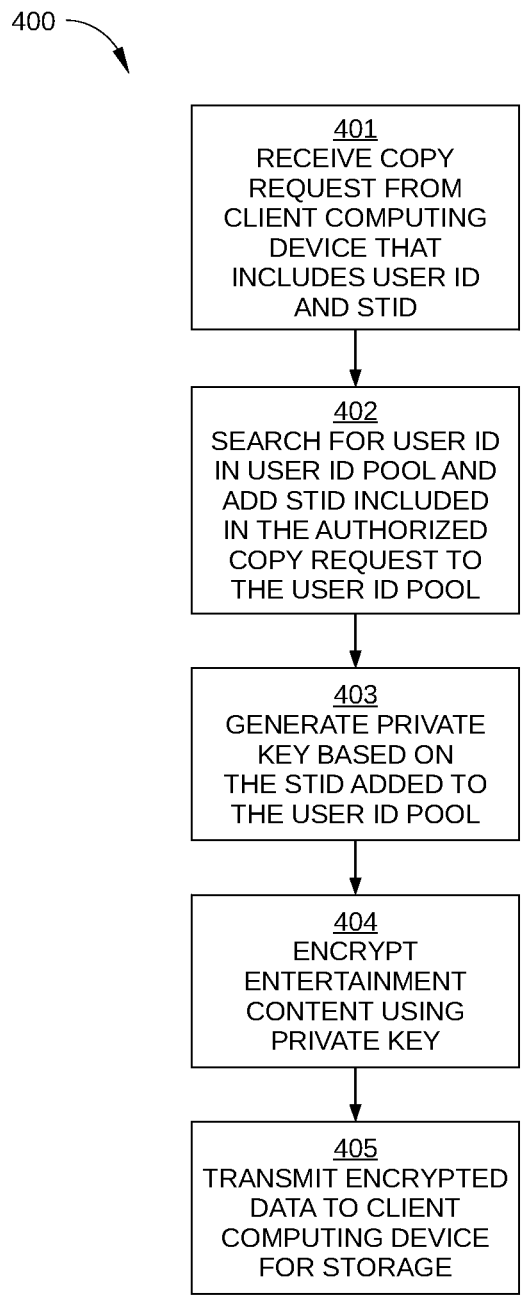
FIG. 4 sets forth a flowchart of method steps carried out by the server device of FIG. 1 when an authorized end-user requests that entertainment content stored on a storage medium be either moved or copied to a different client computing device, according to some embodiments.

FIG. 4 sets forth a flowchart of method steps carried out by server device 180 when an authorized end-user requests that entertainment content stored on storage medium 152 be either moved or copied to a different client computing device 100, according to some embodiments. Although the method steps are described in conjunction with client computing device 100 and server device 180 in FIG. 1, persons skilled in the art will understand that the method in FIG. 4 may also be performed with other types of computing systems. Prior to the method steps described herein, it is assumed that a particular end-user is attempting to store copyright-protected entertainment content onto client computing device 100 for the first time, for example, when the end-user purchases client computing device 100 or moves entertainment content from a different client computing device to client computing device 100. It is also assumed that a user ID of the end-user has been authenticated and the end-user has been logged in.

As shown, method 400 begins at step 401, where server device 180 receives a copy request from client computing device 100 associated with an authenticated user ID. The copy request received in step 401 includes STID 155 associated with client computing device 100. A unique ID number associated with client computing device 100 may also be included in embodiments where private key 181A is generated based on both STID 155 and the unique ID number associated with client computing device 100.

In step 402, server device 180 searches for user ID 119 in user ID pool 185. In the embodiment where the end-user is attempting to store copyright-protected entertainment content onto client computing device 100 for the first time, server device 180 adds the STID to user ID pool 185 and associates that STID to the authenticated user ID. In the embodiment where the copy request is for moving entertainment content from another client computing device to client computing device 100, server device 180 overwrites the STID in user ID pool 185 that corresponds to the authenticated user ID with STID 155. In the embodiment where the copy request is for copying entertainment content from another client computing device to client computing device 100, server device 180 adds an entry in user ID pool 185 associating STID 155 to the authenticated user ID. As a result, the authenticated user ID will be associated with an STID of one or more client computing devices. In embodiments where an authenticated user ID is associated with multiple client computing devices, a download request described in conjunction with FIG. 2 includes the STID of the client computing device making the download request and private key generator 181 of server device 180 generates private key 181A based at least in part of the STID included in the download request. In this manner, although the authenticated user ID may be associated with multiple STIDs, private key generator 181 can generate private key 181A using the correct STID.

In step 403, private key generator 181 generates a private key 181A based at least in part on the STID that corresponds to client computing device 100. In step 404, encryption engine 182 encrypts the requested entertainment content using the private key 181A generated in step 403. In step 405, server device 180 transmits the data encrypted in step 404 to client computing device 100, which stores the encrypted data in storage medium 152 of data storage device 150.

In some embodiments, STID 155 may be a unique ID number associated with a combination of data storage device 150 and an internal status of data storage device 150. For example, STID 155 may be calculated as STID= WWN⊕POH or STID= WWN⊕StatInfo, where ⊕ is a direct sum, POH is a Power-On-Hour of data storage device 150 and StatInfo is statistic information of data storage device 150, such as SMART (Self-Monitoring Analysis and Reporting Technology) data. If data storage device 150 is a solid-state drive (SSD) that includes NAND flash memory, for example, STID 155 may be calculated by STID= WWN⊕EC, where EC is a total, average, maximum, or minimum erase count of NAND flash memory of data storage device 150. Thus, for robust security of copyright-protected content, private key 181A and public key 154A may be recreated periodically by updating STID 155 with the latest internal status of data storage device 150. One such embodiment is illustrated in FIG. 5.

Figure 5:
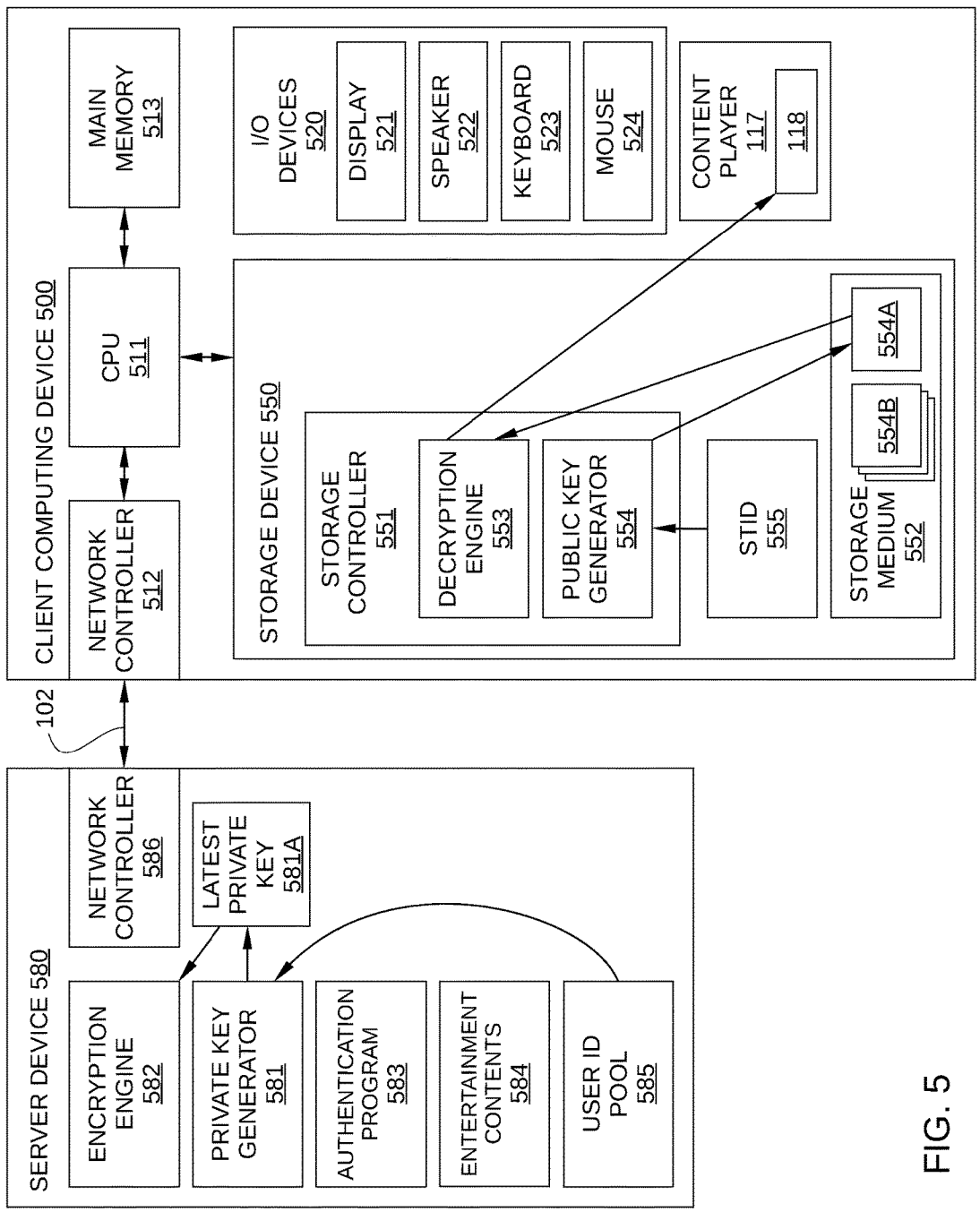
FIG. 5 is a block diagram of a client computing system and a server device, in which embodiments may be implemented.

FIG. 5 is a block diagram of a client computing system 500 and a server device 580, in which embodiments may be implemented. Client computing system 500 is substantially similar to client computing device 100 in FIG. 1, except that client computing system 500 is configured to calculate an STID 555 based on a combination of a unique ID number associated with data storage device 550 and an internal status of data storage device 550, as described above. Thus, when STID 555 is updated or created, server device 580 overwrites the STID in user ID pool 585 with the updated STID, and public key generator 554 of storage controller 551 stores the updated STID 555 or an updated public key 554A created from the updated STID 555 in storage medium 552 as a snapshot. Prior STID 555 values and/or prior public keys 554B are still stored in storage medium 552 after the latest STID 555 is stored. Decryption engine 554 decrypts previously encrypted data using the appropriate prior public key 554B created from the prior STID 555 and decrypts latest encrypted data by the latest public key 554A created from the latest STID 555. Encryption engine 582 always encrypts data by the latest private key 581A created from the latest STID 555. It is noted that both the latest public key 554A and the prior public keys 554B can be accessed by storage controller 551, but are embedded in a portion of data storage device 550 that is not directly accessible by CPU 511 or other host device coupled to data storage device 550.

Figure 6:
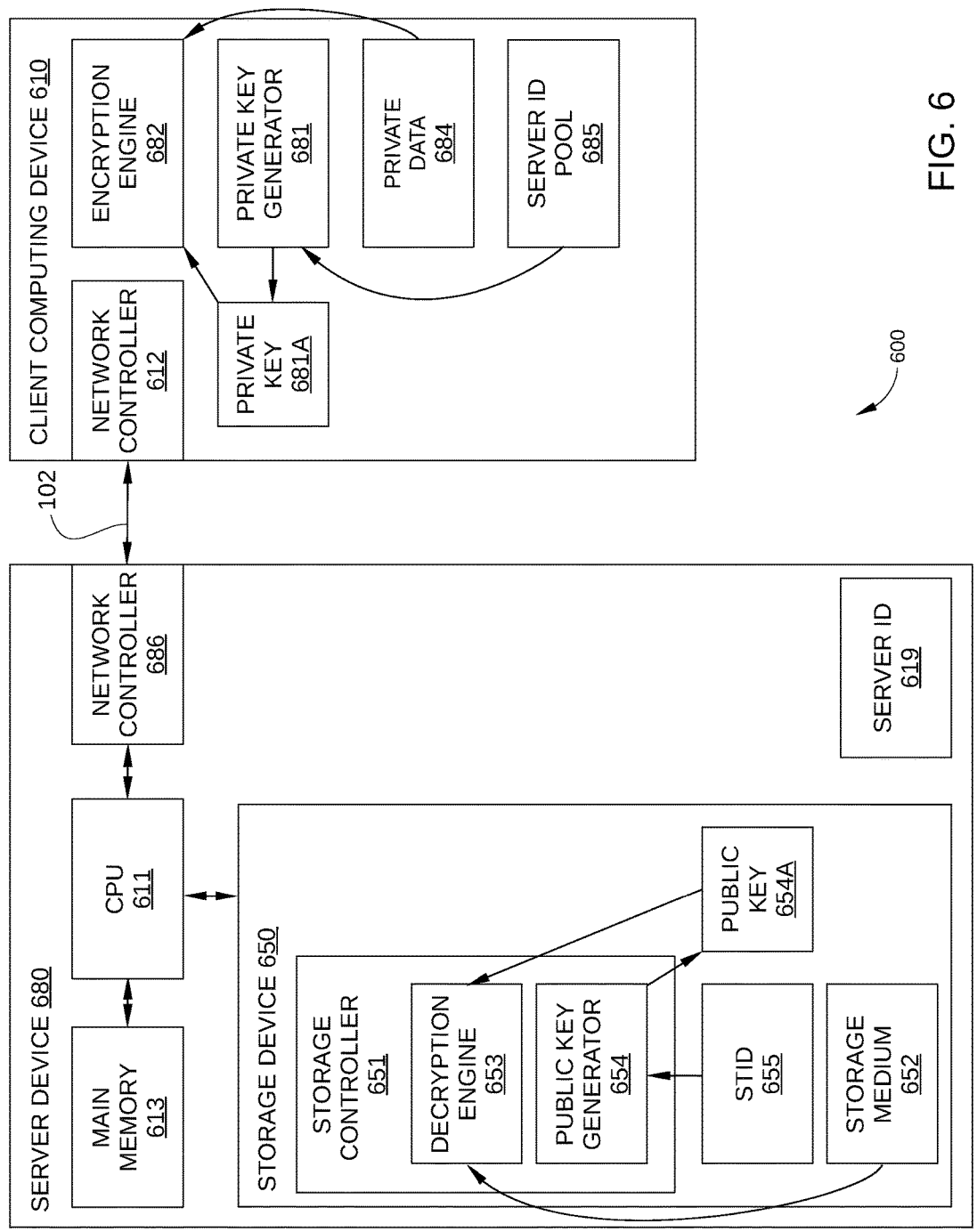
FIG. 6 is a block diagram of a system for securing private data stored by a server, according to an embodiment.

Personal, financial, or otherwise private data are frequently stored on server devices, such as in cloud storage. Such data may be vulnerable to unauthorized access by someone with physical access to the components of the server device and/or by someone able to penetrate the server firewall or other network security. In some embodiments, private data are stored on a server device in encrypted form and therefore are much less susceptible to being exposed to unauthorized access, even when the server device storing such data is compromised. FIG. 6 illustrates a block diagram of a system for securing private data stored by a server, according to an embodiment.

FIG. 6 is a block diagram of a system for securing private data stored by a server, according to an embodiment. System 600 includes a client computing device 600 and a server device 680. As shown, server device 680 includes a storage device 650, a CPU 611, a main memory 613, and a network controller 686, and is configured with a server ID 619. Client computing device 600 includes a private key generator 681, an encryption engine 682, and a network controller 612, and maintains private data 684 and server ID pool 685 therein. Storage device 650, storage medium 652, CPU 611, main memory 613, network controller 686, and network controller 612 are substantially similar in functionality to storage device 150, storage medium 152, CPU 111, main memory 113, network controller 186, network controller 112, respectively, of FIG. 1.

Private key generator 681 and encryption engine 682 are configured to operate as described above for private key generator 181 and encryption engine 182 of FIG. 1, respectively. Hence, private key generator 681 of client computing device 610 generates a private key 681A based at least in part on the STID 655 associated with storage device 650 of server device 680, and encryption engine 682 is configured to encrypt (using private key 681A) private data 684 that are stored in client computing device 610 and selected for storage on server device 680. In some embodiments, private key generator 681 is further configured to generate private key 681A based at least in part on server ID 619, which is a unique ID number that corresponds to server device 680 that has been selected to store encrypted private data. For example, server ID 619 may be a hashed or otherwise synthesized combination of a unique identifier for sever device 680 and a user ID associated with the end-user requesting data storage. Such embodiments prevent the public disclosure of server identification information that is generally not available to the public.

A public key generator 654 of storage device 650 is configured to generate a public key 654A for decryption that is based at least in part on STID 655 (or a combination of STID 655 and server ID 619, in alternative embodiments). In addition, server ID pool 685 of client computing device 610 is configured substantially similar to user ID pool 185 in FIG. 1, and maps one or more STIDs 655 to the server ID 619 on which private data associated with an authorized end-user are stored in encrypted form.

Figure 7:
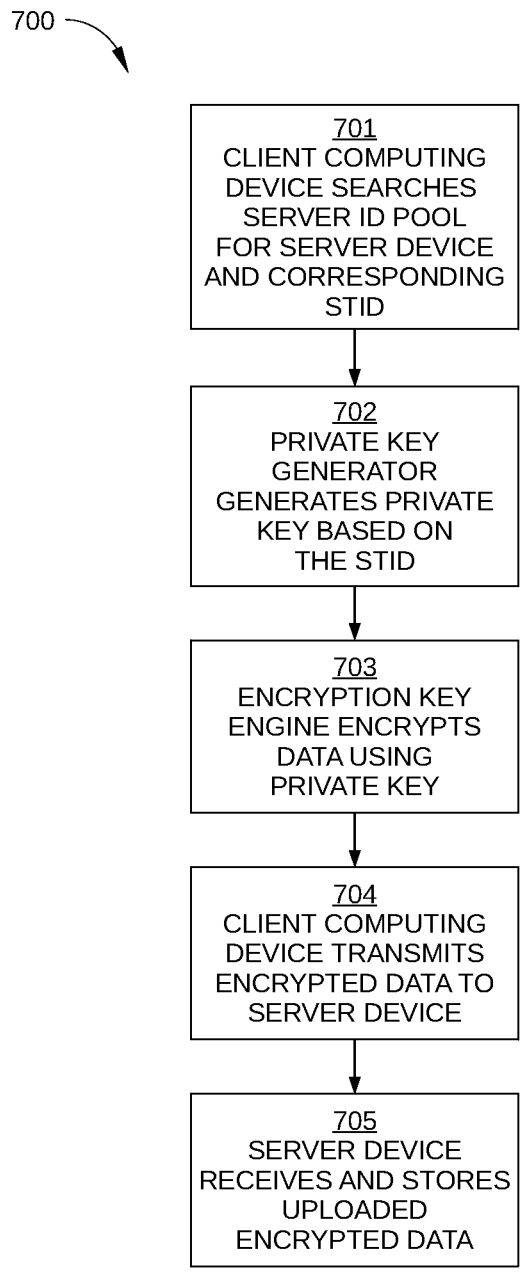
FIG. 7 sets forth a flowchart of method steps carried out by the system of FIG. 6 when an end-user requests data storage on a server device, according to some embodiments.

FIG. 7 sets forth a flowchart of method steps carried out by system 600 when an end-user requests data storage on server device 680, according to some embodiments. Although the method steps are described in conjunction with client computing device 610 and server device 680 in FIG. 6, persons skilled in the art will understand that the method in FIG. 7 may also be performed with other types of computing systems. Prior to the method steps described herein, it is assumed that an end-user has logged into server device 680 and the user ID of the end-user has been authenticated. After logging in, an end-user requests an upload of private data 684 from client computing device 610 to server device 680 and server device 680 returns server ID 619 to client computing device 610.

As shown, method 700 begins at step 701, where client computing device 610 searches server ID pool 685 for STID associated with server ID 619. In step 702, private key generator 681 generates private key 681A based at least in part on the STID (and more enhanced security also the authenticated user ID). In step 703, encryption engine 682 encrypts the private data 684 to be uploaded using private key 681A. In step 704, client computing device 610 transmits the encrypted data to server device 680. In step 705, server device 680 receives the uploaded encrypted data and stores the received encrypted data in storage medium 652.

Thus, when firewall and other security of server device 680 are compromised, access to private data 684 in unencrypted form is not possible. Furthermore, due to the use of private key 681A, which is based at least in part on STID 655, unauthorized decryption of private data 684 is highly unlikely. Specifically, if an unauthorized copy of private data 684 is made from server device 680, private data 684 still cannot be decrypted, even using a storage device that is configured with a decryption engine that is identical to decryption engine 653. This is because the public key necessary for decrypting the encrypted copy of private data 684 is based at least in part on the STID 655 of the data storage device 650 to which private data 684 were originally uploaded by the end-user.

Figure 8:
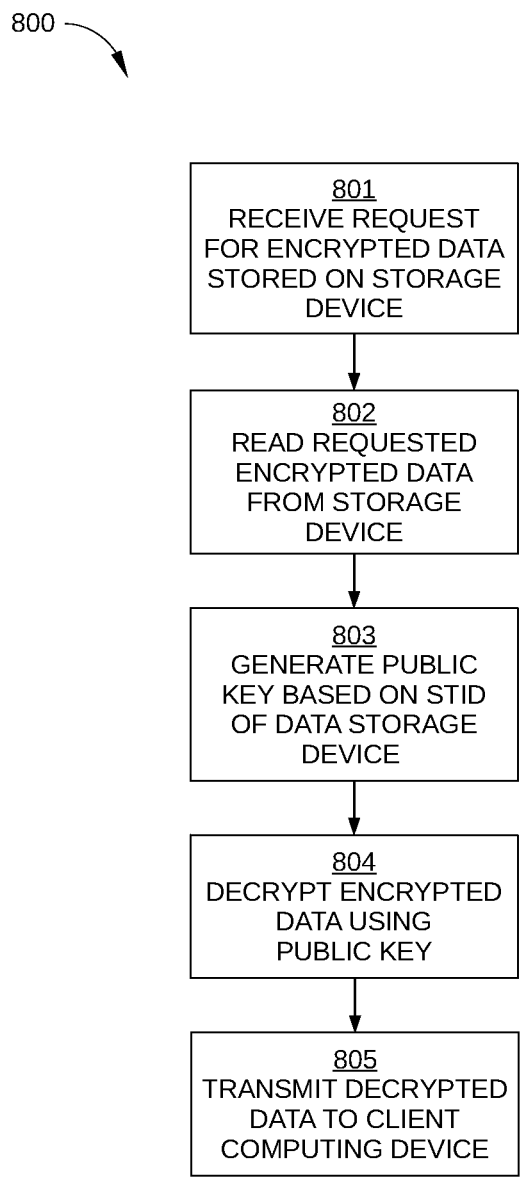
FIG. 8 sets forth a flowchart of method steps carried out by a client computing device when an end-user downloads data stored in encrypted form from a server device, according to some embodiments.

FIG. 8 sets forth a flowchart of method steps carried out by client computing device 610 when an end-user downloads data stored in encrypted form from server device 680, according to some embodiments. Although the method steps are described in conjunction with system 600 in FIG. 6, persons skilled in the art will understand that the method in FIG. 8 may also be performed with other types of computing systems. Prior to the method steps described herein, it is assumed that an end-user has logged into server device 680 and the user ID of the end-user has been authenticated.

As shown, a method 800 begins at step 801, where storage controller 651 of data storage device 650 receives a request for encrypted data stored in data storage device 650. In step 802, storage controller 651 reads the requested encrypted data from storage medium 652. In step 803, public key generator 654 generates a public key 654A based on STID 655 embedded in data storage device 650. For more enhanced security, public key generator 654 may be further configured to generate public key 654A based also on the authenticated user ID. In step 804, decryption engine 653 embedded in storage controller 651 decrypts the encrypted data read from storage medium 652 using public key 654A. In step 805, storage controller 651 transmits decrypted private data 684 to client computing device 610.

In sum, embodiments described herein provide systems and methods for robust security of copyright-protected content when such content is digitally stored in a storage device of an end-user. The copyright-protected content is stored in encrypted form on the end-user storage device, where a private key is used for remote encryption and a corresponding public key is used for local decryption. Because access to the private key cannot be determined from the corresponding public key, and because the private key and public key are based at least in part on a unique ID number embedded in the data storage device, decryption can only be performed by the end-user storage device. In some embodiments, robust security of private data stored in a server environment is provided using a similar public-key/private-key pair and encryption scheme.

While the foregoing is directed to specific embodiments, other and further embodiments may be devised without departing from the basic scope thereof, and the scope thereof is determined by the claims that follow.

I claim:

1. A data storage device of a first computing device, the data storage device comprising:
a storage controller configured with
a decryption key generator configured to generate a public decryption key using a unique ID number that is associated with the data storage device and is assigned by a manufacturer of the data storage device, in response to a request for content, the public decryption key being not unique to the content, and
a decryption engine configured to convert encrypted data corresponding to the content into decrypted data using the generated public decryption key; and
a storage medium that includes encrypted data that have been encrypted by a second computing device, wherein the encrypted data can be decrypted with the public decryption key, wherein
the encrypted data are encrypted using a private encryption key that is different from the public decryption key, and the private encryption key and the public decryption key make up a public-private key pair of an asymmetric key encryption scheme.

2. The data storage device of claim 1, wherein the public decryption key is unique to the data storage device and embedded in the data storage device.

3. The data storage device of claim 1, wherein the decryption key generator is further configured to generate the public decryption key based at least in part on internal information associated with the data storage device that is related to an internal status of the data storage device, and wherein at least one of a latest internal status of the data storage device or a latest public decryption key created from the latest internal status is periodically stored in the storage medium.

4. The data storage device of claim 3, wherein the decryption engine is further configured to decrypt data using the latest public decryption key and prior public decryption keys.

5. The data storage device of claim 1, wherein the private encryption key is generated based at least in part on the unique ID number associated with the data storage device and assigned by the manufacturer of the data storage device.

6. The data storage device of claim 1, wherein the private encryption key is generated by the second computing device.

7. The data storage device of claim 1, wherein the first computing device comprises a client computing device and the second computing device comprises a server device.

8. The data storage device of claim 1, wherein the first computing device comprises a server device and the second computing device comprises a client computing device.

9. The data storage device of claim 8, further comprising a controller configured to receive the encrypted data from the second computing device and store the encrypted data on the storage medium.

10. The data storage device of claim 9, wherein the first computing device is configured to transmit the unique ID number associated with the data storage device and assigned by the manufacturer of the data storage device, to the second computing device prior to receiving the encrypted data from the second computing device.

11. The data storage device of claim 1, wherein the decryption engine is embedded in a portion of the data storage device that is not accessible by a host device coupled to the data storage device.

12. The data storage device of claim 1, wherein the unique ID number associated with the data storage device and assigned by the manufacturer of the data storage device is one of a media access control (MAC) address, a worldwide name (WWN), and an extended unique identifier (EUI).

13. A data storage device of a first computing device, the data storage device comprising:
  a storage controller configured with
    a decryption key generator configured to generate a public decryption key based at least in part on a unique ID number that is associated with the data storage device and is assigned by a manufacturer of the data storage device, in response to a request for content, the public decryption key being not unique to the content, and
    a decryption engine configured to convert encrypted data corresponding to the content into decrypted data using the generated public decryption key; and
  a storage medium that includes encrypted data that have been encrypted by a second computing device,
  wherein the decryption key generator is further configured to generate the public decryption key based at least in part on a unique ID number associated with the first computing device.

14. A data storage device of a first computing device, the data storage device comprising:
  a storage controller configured with
    a decryption key generator configured to generate a public decryption key using a unique ID number that is associated with the data storage device and is assigned by a manufacturer of the data storage device to generate a decryption key, in response to a request for content, the public decryption key being not unique to the content, and
    a decryption engine configured to convert encrypted data corresponding to the content into decrypted data using the generated public decryption key; and
  a storage medium that includes encrypted data that have been encrypted by a second computing device, wherein the encrypted data can be decrypted with the public decryption key,
  wherein the storage controller is further configured to stream the decrypted data into a dedicated memory region of a main memory of the first computing device.

15. The data storage device of claim 14, wherein the first computing device includes a media player configured to play the decrypted data streamed into the dedicated memory region and erase the decrypted data from the dedicated memory region after playing the decrypted data.

* * * * *